US 9,948,149 B2

(12) United States Patent
Muurinen

(10) Patent No.: US 9,948,149 B2
(45) Date of Patent: Apr. 17, 2018

(54) METHOD AND APPARATUS FOR WIRELESS POWER TRANSFER

(71) Applicant: Nokia Technologies Oy, Espoo (FI)

(72) Inventor: Jari Juhani Muurinen, Perniö (FI)

(73) Assignee: Nokia Technologies Oy, Espoo (FI)

( * ) Notice: Subject to any disclaimer, the term of this patent is extended or adjusted under 35 U.S.C. 154(b) by 657 days.

(21) Appl. No.: 14/503,302

(22) Filed: Sep. 30, 2014

(65) Prior Publication Data
US 2015/0097442 A1 Apr. 9, 2015

(30) Foreign Application Priority Data

Oct. 8, 2013 (GB) .................................. 1317748.0

(51) Int. Cl.
| | | |
|---|---|---|
| *H01F 27/42* | (2006.01) |
| *H01F 37/00* | (2006.01) |
| *H01F 38/00* | (2006.01) |
| *H02J 50/80* | (2016.01) |
| *H04B 5/00* | (2006.01) |
| *H02J 5/00* | (2016.01) |
| *H02J 7/02* | (2016.01) |
| *H02J 50/90* | (2016.01) |
| *H02J 50/70* | (2016.01) |
| *H02J 50/40* | (2016.01) |
| *H02J 50/12* | (2016.01) |

(52) U.S. Cl.
CPC .............. *H02J 50/80* (2016.02); *H02J 5/005* (2013.01); *H02J 7/025* (2013.01); *H02J 50/12* (2016.02); *H02J 50/40* (2016.02); *H02J 50/70* (2016.02); *H02J 50/90* (2016.02); *H04B 5/0037* (2013.01); *H04B 5/0075* (2013.01)

(58) Field of Classification Search
CPC .. H02J 50/10; H02J 50/80; H02J 50/90; H02J 7/025; H02J 17/00; H04B 5/0037; H01F 38/14
USPC .......................................................... 307/104
See application file for complete search history.

(56) References Cited

U.S. PATENT DOCUMENTS

2009/0264069 A1* 10/2009 Yamasuge ............ H04B 5/0037
455/41.1
2009/0271047 A1* 10/2009 Wakamatsu ............ H02J 5/005
700/295

FOREIGN PATENT DOCUMENTS

| EP | 2685583 A2 | 1/2014 |
| JP | 2013-138599 A | 7/2013 |
| WO | 2014/038862 A1 | 3/2014 |

OTHER PUBLICATIONS

Search Report received for corresponding United Kingdom Patent Application No. 1317748.0, dated Apr. 14, 2014, 4 pages.

* cited by examiner

*Primary Examiner* — Carlos Amaya
(74) *Attorney, Agent, or Firm* — Banner & Witcoff, Ltd.

(57) ABSTRACT

In accordance with an example embodiment of the present invention, an apparatus comprises a wireless power receiver configured to receive a wireless power signal, a communication circuitry configured to transmit one or more change requests associated with a quantity of the wireless power signal, and a control circuit configured to measure a plurality of reception levels associated with the quantity of the wireless power signal and to determine whether the plurality of reception levels corresponds to the one or more change requests.

26 Claims, 9 Drawing Sheets

METHOD AND APPARATUS FOR WIRELESS POWER TRANSFER

TECHNICAL FIELD

The present application relates generally to wireless power transfer systems wherein an electromagnetic field is used to transfer energy over the air.

BACKGROUND

Electromagnetic induction has been known for a long time and it has been used in many applications such as generators, electronic motors and transformers. In electromagnetic induction a time-varying magnetic flux induces an electromotive force to a closed conductor loop. Vice versa, a time-varying current creates a varying magnetic flux. In transformers, this phenomenon is utilized to transfer energy wirelessly from one circuit to another via inductively coupled coils. A primary coil transforms an alternating current into a varying magnetic flux, which is arranged to flow through the secondary coil. The varying magnetic flux then induces an alternating voltage over the secondary coil. The proportion of the input and output voltage can be selected by configuring the number of turns in the primary and secondary coils.

Wireless power transfer is another application where electromagnetic induction is used to transfer energy over the air. A wireless power transfer system may for example comprise a pair of coils coupled to each other for transferring energy by means of electromagnetic induction. A wireless power transfer system may comprise a transmitter device with a primary coil, and a receiver device with a secondary coil. For example, the transmitter may be a wireless charger device with the primary coil inductively coupled to a secondary coil of the receiver device. The current in the charger device is transferred to the receiver device through the electromagnetically coupled primary and secondary coils. The induced current may be further processed in the receiver device, for example to charge a battery. The secondary coil may be removably coupled to the primary coil, for example where the secondary coil is in a portable device.

SUMMARY

Various aspects of examples of the invention are set out in the claims. According to a first aspect of the present invention, an apparatus is disclosed. The apparatus may comprise a wireless power receiver configured to receive a wireless power signal, communication circuitry configured to transmit one or more change requests associated with a quantity of the wireless power signal, and/or a control circuit configured to measure a plurality of reception levels associated with the quantity of the wireless power signal and to determine whether the plurality of reception levels corresponds to the one or more change requests.

According to a second aspect of the present invention, an apparatus is disclosed. The apparatus may comprise a wireless power transmitter configured to transmit a wireless power signal, control circuitry configured to cause a change of a quantity of the wireless power signal among a plurality of transmit levels, and/or communication circuitry configured to receive at least one control message indicating a plurality of measured reception levels associated with the quantity of the wireless power signal. The control circuit may be further configured to determine whether the plurality of reception levels corresponds to the plurality of transmit levels.

According to a third aspect of the present invention, a method is disclosed. The method may comprise receiving a wireless power signal, transmitting one or more change requests associated with a quantity of the wireless power signal, measuring a plurality of reception levels associated with the quantity of the wireless power signal, and/or determining whether the plurality of reception levels corresponds to the one or more change requests.

According to a fourth aspect of the present invention, a method is disclosed. The method may comprise transmitting a wireless power signal, changing a quantity of the wireless power signal among a plurality of transmit levels, receiving at least one control message indicating a plurality of measured reception levels associated with the quantity of the wireless power signal, and/or determining whether the plurality of reception levels corresponds to the plurality of transmit levels.

According to a fifth aspect of the present invention, a computer program is disclosed. The computer program may comprise code configured to receive a wireless power signal, code configured to transmit one or more change requests associated with a quantity of the wireless power signal, code configured to measure a plurality of reception levels associated with the quantity of the wireless power signal, and/or code configured to determine whether the plurality of reception levels corresponds to the one or more change requests.

According to a sixth aspect of the present invention, a computer program is disclosed. The computer program may comprise code configured transmit a wireless power signal, code configured to cause a change of a quantity of the wireless power signal among a plurality of transmit levels, code configured to receive at least one control message indicating a plurality of measured reception levels associated with the quantity of the wireless power signal, and/or code configured to determine whether the plurality of reception levels corresponds to the plurality of transmit levels.

According to a seventh aspect of the present invention, a computer-readable medium is disclosed. The computer-readable medium may be encoded with instructions that, when executed by a computer, may perform transmitting a wireless power signal, changing a quantity of the wireless power signal among a plurality of transmit levels, receiving at least one control message indicating a plurality of measured reception levels associated with the quantity of the wireless power signal, and/or determining whether the plurality of reception levels corresponds to the plurality of transmit levels.

According to an eighth aspect of the invention a computer-readable medium is disclosed. The computer-readable medium may be encoded with instructions that, when executed by a computer, may perform receiving a wireless power signal, transmitting one or more change requests associated with a quantity of the wireless power signal, measuring a plurality of reception levels associated with the quantity of the wireless power signal, and/or determining whether the plurality of reception levels corresponds to the one or more change requests.

According to a ninth aspect of the invention an apparatus is disclosed. The apparatus may comprise means for receiving a wireless power signal, communication means configured to transmit one or more change requests associated with a quantity of the wireless power signal, and/or control means configured to measure a plurality of reception levels associated with the quantity of the wireless power signal and/or to determine whether the plurality of reception levels corresponds to the one or more change requests.

According to a tenth aspect of the invention an apparatus is disclosed. The apparatus may comprise means for transmitting a wireless power signal, control means configured to cause a change of a quantity of the wireless power signal among a plurality of transmit levels, and/or communication means configured to receive at least one control message indicating a plurality of measured reception levels associated with the quantity of the wireless power signal. The control means may be further configured to determine whether the plurality of reception levels corresponds to the plurality of transmit levels.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
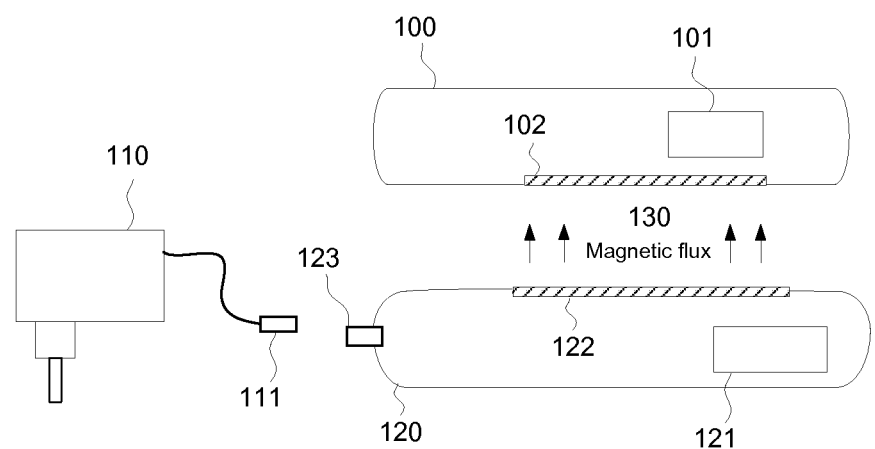
FIG. 1 illustrates an example of a wireless power transfer system.

A wireless power transfer device may include shielding to prevent a magnetic field entering the device and hence to protect components of the device, such as for example a battery or a printed writing board. Shielding may be implemented, for example, by one or more ferrite shields located proximate a coil that is used to create a magnetic field in a wireless power transmitter or to capture a magnetic field in a wireless power receiver. The shielding materials may, however, have only a partial shielding capability and the shielding capability may depend on one or more parameters of the wireless power transfer. For example, ability of a shielding material to absorb or direct a magnetic field may depend on the magnetic flux density or frequency. A wireless power transfer device may therefore comprise circuitry to detect changes in the shielding capability. For example, if a receiver knows the transmitted power and is capable of measuring the received power, it may determine an optimal transmission power level that does not cause changes in the shielding capability. A wireless power transfer device may also comprise circuitry configured to perform corrective actions to avoid a reduced shielding capability.

Example embodiments of the present invention and its potential advantages are understood by referring to FIGS. 1 through 9 of the drawings.

In general, wireless power transfer systems include any means for transferring electrical energy in a contactless fashion. In an inductive power transfer system a transmitter is inductively coupled to at least one receiver and the transmitter transforms electrical energy from a power supply to a magnetic field towards the receiver. Depending on the characteristics of the devices, the inductively coupled devices may be configured to resonate at a resonance frequency to increase the extent of coupling, such as for example the magnetic flux from the transmitter to the receiver. Such inductive power transfer systems may be called resonance power transfer or resonance charging systems.

Inductive power transfer may be applied in a range of devices such as mobile phones, cameras, laptops, tablet computers, personal data assistants, PDA, music/video players and the like. The devices may include may also include consumer appliances such as electric toothbrushes, torches, console controllers. The transmitter may draw the transferred energy from a power supply, for example. The power supply may be external, such as for example a mains cable, a wall charger, a USB charger, a spare battery with a wired power supply interface, or internal, such as for example a battery, solar panel, kinetic energy generator, fuel cell, power harvester or the like. The receiver device may comprise an energy storage, such as for example one or more batteries and/or one or more supercapacitors, or, the receiver device may have the option to instantly consume the delivered energy without storing it for future use or deliver it to another device.

The wireless power transfer between a transmitter and a receiver may follow standardized procedures such as, for example, procedures described in a Qi specification by Wireless Power Consortium, A4WP, Alliance for Wireless Power, WPA, Wireless Power Alliance, or PMA, Power Matters Alliance. The transmitter and receiver device may communicate with each other to negotiate parameters related to the power transfer according to a particular standard. Communication between the devices may be arranged by using the power transfer signal, that is, the signal conveying power between the transmitter and the receiver, or by another communication means such as for example Bluetooth, NFC, Near-Field Communication, infrared, or Wireless Local Area Network, IEEE 802.11. A communication interface between the wireless power transmitter device and wireless power receiver device may be also used to communicate other data than what is necessary for performing power transfer in accordance with a wireless power transfer standard. For example, the transmitter and receiver devices may exchange data related to the status of at least one of the devices, which may be taken into account when determining parameters to be used in the power transfer.

Although embodiments of the invention may be described as related to wireless charging apparatuses, it should be appreciated that any type of wireless power transfer is in the scope of the invention. Also, the wireless power transfer devices described throughout the specification may or may not include a dual-mode wireless power capability, that is, the embodiments of the invention may be applied in any suitable type of wireless power transfer devices, including transmitters with one or more transmitter units and one or more coils, receivers with one or more receive units and one or more coils, or combinations thereof.

FIG. 1 illustrates an example of a wireless power transfer system, where energy can be transferred through electromagnetic induction. The illustrated system can support at least some embodiments of the invention. Wireless power transmitter device 120, which may comprise, such as for example, a wireless charging, WLC, platform or a mobile phone with WLC transmitter capability, may comprise inductive means 122 to transform electrical energy to a time-varying magnetic flux 130. The inductive means 122 may comprise, for example, one or more coils of electrically conductive material. The wireless power transmitter device 120 may be powered by at least one of a power supply interface 123 and energy storage means 121. The energy storage means may comprise at least one battery, for example, wherein the at least one battery may be rechargeable. The power supply interface 123 may be connectable to a plug 111 of an external power supply 110. Power supply interface 123 may be generally considered to be an example of power supply means, wherein power supply means may include or support at least one of many possible types of power supply systems. For example, external power supply 110 may be a direct current, DC, power supply connectable to mains power or to another device. External power supply 110 may be, for example, a wall charger with dedicated charger plug or alternatively a universal serial bus, USB, plug. External power supply 110 may comprise a USB cable connectable to another device capable of providing power over the USB interface, or any other data interface. Power supply interface 123 may comprise a plurality of connectors adapted to receive one or more external power supplies. In some embodiments, the power supply interface 123 may be a wireless power interface.

The wireless power transmitter device 120 may comprise internal circuitry, one or more processors and one or more memories, which may be used to control operations performed in the wireless power transmitter device 120. For example, the electric current available from the power supply interface 123 may be arranged to flow through the inductive means 122, which may cause the magnetic flux 130 to appear. The wireless power transmitter device 120 may comprise means for modifying a received DC current from the power supply interface 123 or the energy storing means 121 to supply the inductive means 122 with an alternating current, AC. An AC current causes the magnetic flux 130 to be time-variant and thus capable of inducing an electromotive force in a conductor. Means for modifying the DC current to supply the inductive means 122 with an alternating current may comprise, for example, an inverter, such as for example a square wave inverter or a sine wave inverter.

The wireless power receiver device 100, such as for example a mobile phone or other portable device, comprises inductive means 102 arranged to transform the magnetic flux 130 into an electric current. Inductive means 102 may comprise, for example, one or more coils of electrically conductive material. The wireless power receiver device 100 may comprise any internal circuitry, one or more processors and one or more memories, which may be used to control the operation of the wireless power receiver device 100. For example, the wireless power receiver device 100 may include an AC-to-DC converter for converting an alternating current to a direct current. The wireless power receiver device 100 may include energy storage means 101 such as for example a battery, for storing the electric energy captured by the inductive means 102.

Each of the inductive means 102, 122 may be implemented as at least one coil or a combination of at least one coil and analog components such as capacitors to enable the inductive means 102, 122 to resonate at a resonance frequency. The inductive means 122 at the transmitting side may be called a primary coil and the inductive means 102 at the receiver side may be called a secondary coil. In general, inductive means 102, 122 may include any kind of elements that enable inductive coupling between wireless power transmitter device 120 and receiver 102, that is, are capable of creating interdependence between a current and a magnetic flux.

Figure 2A:
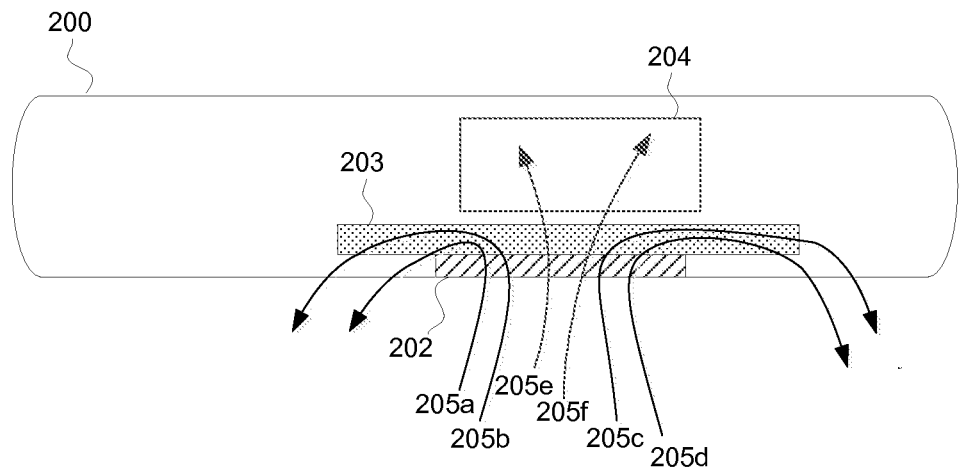
FIG. 2a illustrates a wireless power transfer apparatus, according to example embodiments of the invention.

FIG. 2a illustrates an example of a wireless power transfer device 200. Device 200 may be configured to operate as a power transmitter, a power receiver, both a power transmitter and a power receiver, or neither of them. Device 200 may for example represent more detailed structure of devices 100, 120 of FIG. 1.

Device 200 may comprise one or more transmitter or receiver coils 202 to transform electrical energy to a magnetic field or to transform a magnetic field to electrical energy, as described elsewhere in this document. Device 200 may comprise a shield 203. Shield 203 may comprise high permeability material that is capable of diverting or absorbing the magnetic flux. A high permeability material capable of diverting magnetic flux may for example have a relative permeability of $\mu_r > 10$, for example $\mu_r = 40$, where $\mu_r$ is the ratio of permeability of the particular material to permeability of free space. A high permeability material capable of absorbing magnetic flux may for example have a relative permeability of $\mu_r = 500$. Shield 203 may be, for example, made of a ferrite material that provides a low reluctance path for a magnetic field such that the magnetic field does not enter the components behind the shield. Applying an external magnetic field to shield 203 may cause shield 203 to magnetize, that is, at least part of small magnetic moments in the shied material may be aligned in the direction of the external magnetic field. External magnetic field 205 may be caused for example by a wireless power transmitter and/or a permanent magnet residing in a wireless power transfer device. The rate of magnetization in the external magnetic field is proportional to the permeability of the material. A high permeability material will have strong tendency to magnetize and a low permeability material does not magnetize even in a strong magnetic field. Magnetization of a material reaches maximum, when all magnetic moments of the material have pointing in the direction of the external magnetic field. Such condition may be called saturation, where increasing an external magnetic field does not cause further magnetization in the saturated material. Hence, a saturated shield may not be capable of directing a magnetic flux as effectively as a non-saturated shield.

FIG. 2a illustrates operation of a shield in an external magnetic field. Magnetic flux 205 may be produced by another device, such as for example a wireless charging platform, or it may be produced by device 200 itself. The arrows indicating the direction of the magnetic flux 205 are examples and the flux may flow in any direction. Magnetic flux 205 may flow through coil 202 and enter shield 203. Due to high permeability of shield 203, magnetic flux 205 may be guided through a low reluctance path inside shield 203 such that it does not enter the interior of device 200. This is illustrated by flux contours 205a, 205b, 205c and 205d. However, if magnetic flux is strong enough, it will cause shield 203 to saturate. In that case, at least part of magnetic flux, illustrated by flux contours 205e and 205f, may penetrate through shield 203 and enter the interior of device 200. This may cause undesired interference, such as power loss, because part of the energy of magnetic flux 205 may be consumed in heating or inducing Eddy currents in the internal components of device 200. The power loss may be seen as an additional load 204 to the system. Therefore, when shield 203 is saturated, part of the transferred energy begins to be consumed in load 204, which decreases efficiency of power transfer through coil 202. This is since a saturated shield may not be capable of directing a magnetic flux as effectively as a non-saturated shield.

Figure 2B:
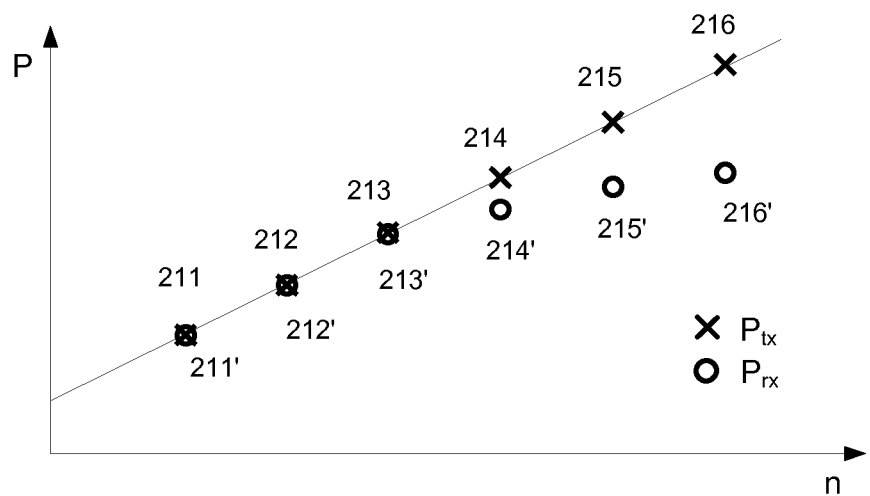
FIG. 2b presents received and transmitted power with respect to a number of measurement, according to example embodiments of the invention.

FIG. 2b illustrates examples of transmitted power, labeled by 'x', and received power, labeled by 'o', in wireless power transfer device 200 with respect to a series of measurements. In the three first measurements, the received powers 211', 212', 213' correspond to the transmitted powers 211, 212, and 213. There is no substantial loss in the system and thus changing the transmitted power causes a corresponding change in the received power. In the fourth measurement, shield 203 has started to saturate, and part of the transmitted power 214 leaks to load 204. The received power 214' is therefore lower than the transmitted power 214. When the transmission power is further increased in points 215 and 216, the received powers 215' and 216' do not increase according to the transmitted power, because part of the power increment is lost in load 204.

Figure 3A:
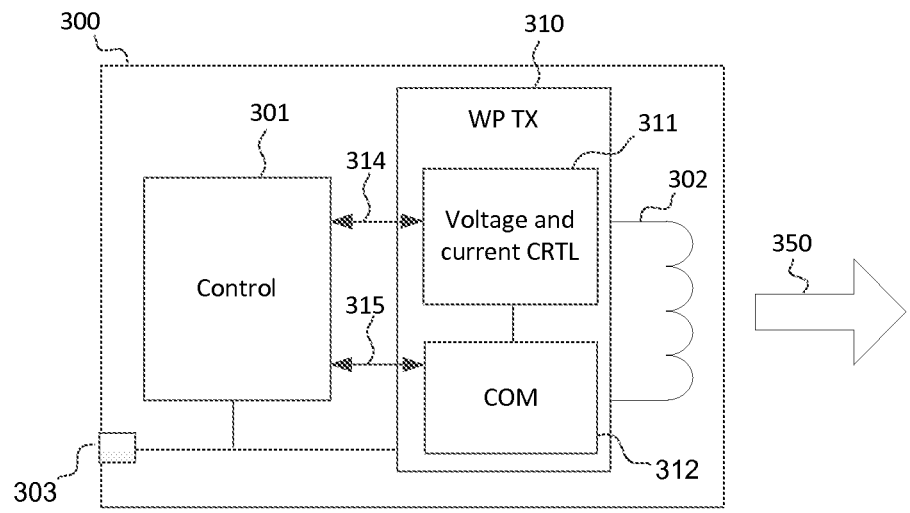
FIGS. 3a and 3b illustrate wireless power transmitter and receiver apparatuses, according to example embodiments of the invention.

FIG. 3a illustrates an example of a wireless power transmitter device 300, such as for example devices 120 and 200. Device 300 may comprise a wireless power transmitter 310, labeled as "WP TX" in FIG. 3a, which may be connected to one or more coils 302 to generate a wireless power signal 350. Wireless power transmitter 310 may be configured to control the transmission of wireless power through coil 302. Wireless power transmitter 310 may be implemented for example as an integrated circuit comprising at least one power input for receiving a power signal from a battery (not shown) or power supply 303, voltage and current control circuitry 311 to control the transmission current and/or voltage, and an optional communication circuitry 312 ("COM") to transmit or receive data. Voltage and current control circuitry 311 may be connected to communication circuitry 312 to exchange information, such as for example information about transmission power, reception power, power loss, and operating frequency of the transmitter. Voltage and current control circuitry 311 may be configured to measure one or more power transmission quantities, such as for example voltage, current, temperature, and frequency. Voltage and current control circuitry 311 may be configured to adjust at least one power transmission parameter, such as for example voltage, current, power, duty cycle, or frequency based on information received via the communication circuitry 312. Communication circuitry 312 may comprise at least one of a modulator to modulate digital information to the power signal transmitted through coil 302 to a wireless power receiver device, a demodulator to sense variations in the power drawn by the power receiver device to demodulate digital information, and a processor for processing the demodulated information.

Wireless power transmitter 310 may comprise a control interface for communicating with other functions of device 300 or external devices such as a wireless power receiver device. For example, wireless power transmitter 310 may be connected to control circuitry 301 of device 300. The control interface may be configured to transmit or receive one or more control signals 314, such as for example an enable or disable signal causing the wireless power transmitter 310 to enable or disable delivering power to coil 302. The control signal 314 may also comprise instructions how to change the transmitted power. For example, the control signal 314 may comprise instructions to increase the transmitted power by defined step(s) or to decrease transmission power to a defined value. Control signal 314 may comprise instructions regarding other parameters of the system, such as for example operating frequency of the wireless power transmitter 310. In some embodiments, control signals 315 may be exchanged between control circuitry 301 and communication circuitry 312.

Control circuitry 301 may control power transmission related functionality in device 300 and it may be connected to various other functions in device 300 to transmit and receive information. Transmitted or received information may comprise information related to wireless power transfer operations and/or a status of the device. Wireless power control 301 may be implemented as a separate logical or physical entity. For example, it may be implemented as a computer program lying at the memory of device 300 and being operable by at least one processor or processing core of device 300. In particular, control circuitry 301 may be connected to the wireless power transmitter 310, for example to transmit or receive control signals 314. Control circuitry 301 may be configured to measure or analyze one or more power transmission quantities and/or cause adjustment of at least one power transmission parameter, similar to voltage and current control circuitry 311. Control circuitry 301 may however have wider responsibility in device 300 to control the power transfer. For example, voltage and current control circuitry 311 may control the transmission power during normal power transfer operations, but control circuitry 301 may provide further instructions to voltage and current control 311.

Figure 3B:
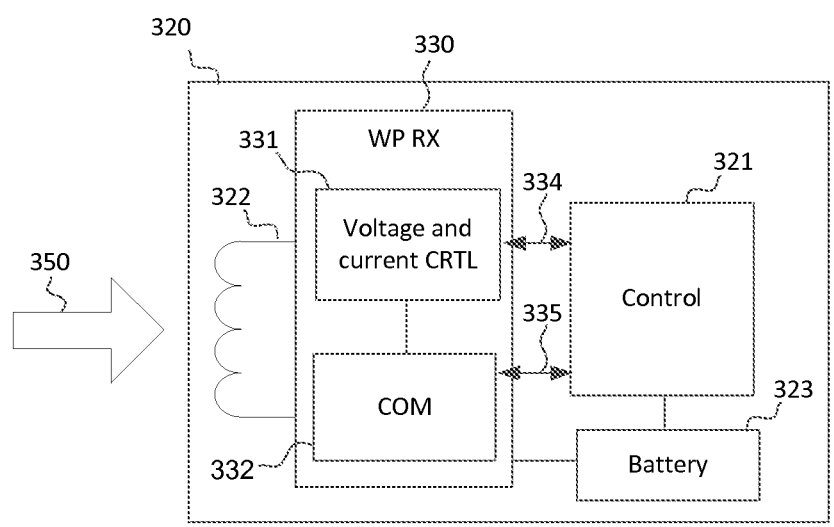

FIG. 3b illustrates an example of a wireless power receiver device 320. Device 320 may comprise a wireless power receiver 330, labeled as "WP RX" in FIG. 3b, which may be connected to one or more coils 322. Wireless power receiver 330 may be configured to control the reception of wireless power through coil 322. Wireless power receiver 330 may be implemented for example as an integrated circuit comprising at least one power output, voltage and current control circuitry 331 to control the power reception, and an optional communication circuitry 332 ("COM") to transmit or receive data. Wireless power receiver 330 may be operably connected to at least one battery 323, or more generally to any kind of energy storage means. Battery 323 may be capable of receiving a charging current and outputting a discharge current to provide power to other components of device 320, for example control circuitry 321 or wireless power receiver 330. Battery 323 may also include a control interface to communicate with other entities in device 320. Alternatively, power received by wireless power receiver 330 may be instantly consumed in device 320, or the received power may be delivered for consumption or storage outside device 320.

Voltage and current control circuitry 331 may be connected to communication circuitry 332 to exchange information, such as for example information about transmission power, reception power, power loss, and operating frequency of a wireless power transmitter. Voltage and current control circuitry 331 may be for example configured to measure and/or request to change one or more power transmission parameters, such as for example voltage, current, temperature, or frequency. Communication circuitry 332 may comprise at least one of a modulator to modulate digital information to the power signal transmitted through coil 322 to a wireless power receiver device, a demodulator to sense variations in the power signal provided by a wireless power transmitter device to demodulate digital information, and a processor for processing the demodulated information. Modulating information to the received signal may be implemented for example by connecting and disconnecting an additional load to change the power drawn from a wireless power transmitter device.

Wireless power receiver 330 may comprise a control interface for communicating with other functions of device 320 or external devices such as a wireless power transmitter device. For example, wireless power receiver 330 may be connected to control circuitry 321 of device 320. The control interface may be configured to transmit or receive one or more control signals 334, such as for example instructions to request a wireless power transmitter to enable or disable power transmission. Control signal 334 may also comprise instructions to request a power transmitter to change the transmitted power. For example, the control signal 334 may comprise instructions to request increasing the transmitted power by defined step(s) or to decrease transmission power to a defined value. Control signal 334 may also comprise instructions regarding other parameters of the system, such as for example operating frequency of a wireless power transmitter. In some embodiments, control signals 335 may be exchanged between control circuitry 321 and communication circuitry 332.

Some components illustrated in FIGS. 3a and 3b may not be present in all embodiments of the invention and devices 300 and 320 may also comprise components not shown in FIGS. 3a and 3b. For example, connections from components to each other may be implemented via other components that may or may not be shown in FIGS. 3a and 3b.

The examples of structural elements in FIG. 2 and FIGS. 3a and 3b may be generally seen as means for performing one or more functions. For example, shield 203 may be seen as an example of shielding means, wireless power transmitter 310 may be seen as an example of means for transmitting wireless power, wireless power receiver 330 may be seen as an example of means for receiving wireless power, communication circuitries 312, 332 may be seen as an example of communication means, power supply 303 may be seen as an example of power supply means, control circuitries 301, 311 may be seen as an example of control means, battery 323 may be seen as an example of energy storage means, and coils 302, 322 may be seen as examples of inductive means. Elements may be configured to perform functions described elsewhere in this document.

Figure 4A:
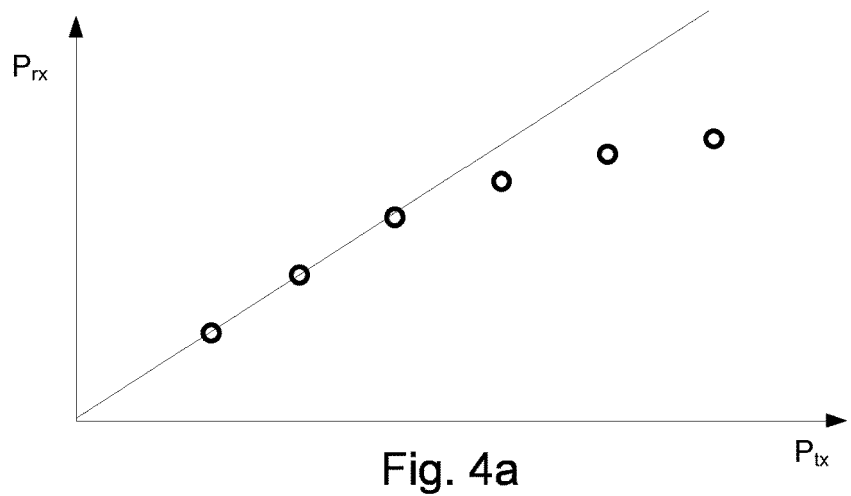
FIGS. 4a, 4b, and 4c illustrate transmitted and received power, according to example embodiments of the invention.

FIG. 4a illustrates transmitted and received power, for example transmitted power from wireless power transmitter 310 and received power at wireless power receiver 330.

In FIG. 4a the horizontal axis represents the transmitted power, $P_{tx}$, and the vertical axis represents the received power, $P_{rx}$. The different measurements are marked by 'o' and their positions in the 2-dimensional structure represent the received power with respect to the transmitted power. Notably, the different measurements do not indicate or depend on the measurement time or sequence number since the axes are presented in terms of power, not time or sequence number. A saturation condition can be seen similarly to FIG. 2. In a non-saturated system the relationship of the transmitted and received power is linear, which is illustrated in FIG. 2 by the dashed line. When a shield, such as for example shield 203, saturates, the received power is lower than the transmitted power and the measurements deviate from the expected linear behavior between transmitted and received power.

Figure 4B:
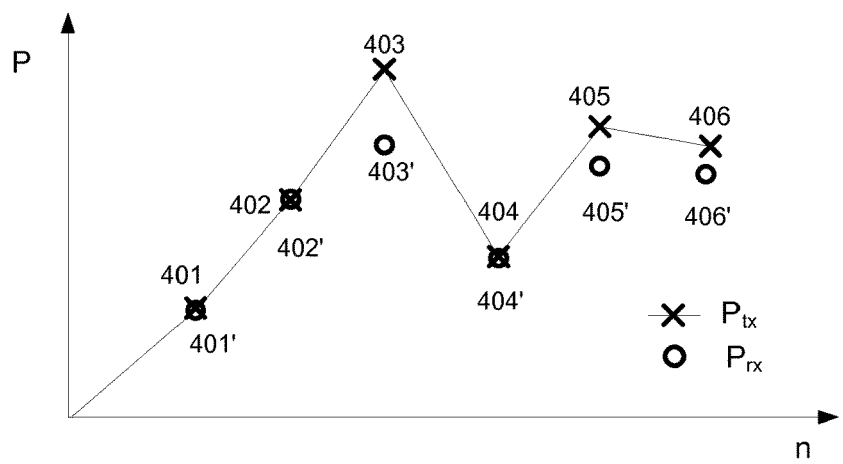

FIG. 4b illustrates the transmitted power and received power during six sequential example measurements from 401 to 406. In the first two measurements, the receiver device is not saturated and the received power 'o' (401', 402') corresponds to the transmitted power 'x' (401, 402). In the third measurement the transmitter has increased the transmitted power 403 such that the receiver device is saturated. Hence, the received power 403' is lower than the transmitted power 403. During the fourth measurement, the transmitter has decreased power to a level that does not cause saturation in the receiver device and therefore the received power 404' corresponds again to the transmitted power. In the last two measurements, the receiver device is again saturated and the received powers 405', 406' are therefore lower than the transmitted powers 405, 406.

Figure 4C:
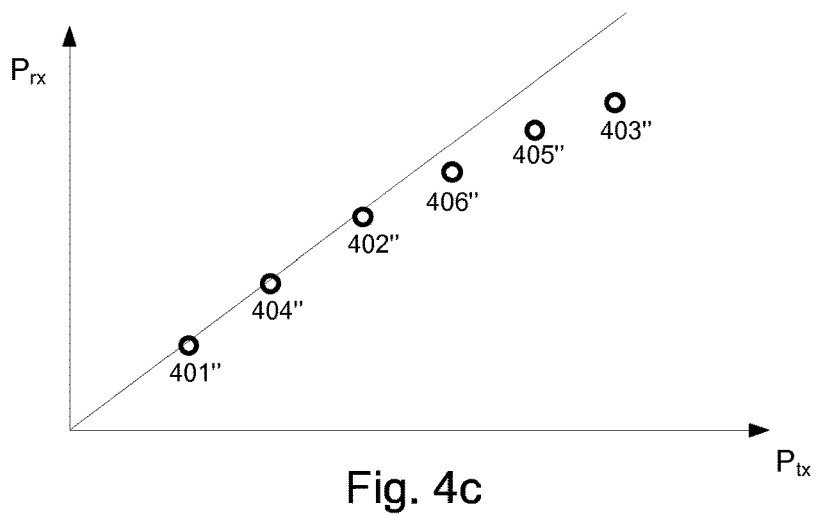

FIG. 4c presents the received power with respect to transmitted power in measurements 401" to 406". The received power versus transmitted power for the first measurement is represented by 401", the received power versus transmitted power for the second measurement is represented by 402", and so on. It can be observed that measurements follow the expected linear behavior until the transmitted power starts to saturate the receiver device. Hence, if a receiver knows the transmitted power and is capable of measuring the received power, it can determine an optimal transmission power level by selecting the highest transmitted power level that does not cause deviation from the expected linear behavior. In the example of FIG. 4c, the optimal selection would be transmission power that corresponds to measurement 402. Embodiments of the invention provide various methods to inform the receiver about the transmitted power or to estimate the transmitted power at the receiver device, as described elsewhere in this document.

A wireless power transfer, such as for example devices 300 or 320 may implement saturation detection methods that may determine deviation from the expected behavior of a reception level associated with a quantity of a wireless power signal 350 with respect a transmission level of the quantity of the wireless power signal 350. Although the description primarily uses power as an example of the quantity of the wireless power signal 350, it should be understood that embodiments can be alternatively implemented by using a different quantity of the wireless power signal 350, such as for example, current, voltage, power, energy, or frequency.

In one example embodiment, a wireless power transfer device may perform saturation detection by comparing a difference of the transmitted power level and the receiver power to a threshold. If the difference between the transmitted power and received power exceeds the threshold, the wireless power receiver device may determine occurrence of saturation. In some cases, a foreign energy consuming object may be placed between the wireless power transmitter and wireless power receiver. It is an object of some embodiments of the invention to provide a reliable saturation detection method that is not deteriorated in presence of foreign objects.

According to an embodiment, a wireless power transfer device performs saturation detection by using multiple measurements of transmitted and received power. A measurement is in this context understood to include any means to obtain information about the transmitted or received power level, such as for example, actual measurements of voltage or current and/or received or estimated information about transmitted or received power. A wireless power transfer device may store results of at least two measurements of transmitted power and received power and compute a linear model over the measurement data. In a simple example, the wireless power transfer device may determine a slope of a line between two measurements, such as for example the dashed line of FIG. 4c via measurements 401" and 402". Such a model may indicate an expected receive power for each value of transmitted power. A wireless power receiver device may then set a threshold for a deviation from the expected value and determine occurrence of saturation when the threshold is exceeded. A benefit of using a linear model over multiple measurements is that non-linear behavior caused by a saturated shield can be detected. Advantageously, the algorithm is insensitive to presence of foreign objects between the wireless power transmitter and wireless power receiver, because power loss due to a foreign object is linear with respect to the transmitted power. Linear power loss may comprise, for example, that a relative deviation between a transmitted and received power caused by the foreign object is constant with respect to the transmitted power. If such a relative deviation is expressed in decibels, for example, the decibel figure may be constant. Hence, the behavior of the receiver power versus transmitted power can be more reliably linked to occurrence of saturation.

According to at least some embodiments of the invention, linear regression models are used to obtain the linear model. For example, the wireless power transfer device may use a plurality of reception levels associated with a quantity of the received signal and calculate a linear least squares regression over the plurality of reception levels versus transmission levels. A least squares regression produces a fitting line that minimizes the sum of the squares of the errors between the produced linear model and the actual measurement samples. The fitting line is an example of a linear model. A wireless power transfer device may detect saturation by comparing individual measurement samples to the linear model and set an error threshold that indicates saturation. If an error between an individual measurement of received power and the linear model exceeds the error threshold, the device may determine occurrence of saturation. Alternatively, a residual threshold may be set to the sum of residual errors of the linear model. A wireless power transfer device may update the regression model after a measurement and estimate the accuracy of the regression by the sum of residual errors. If the sum of residual errors exceeds the residual threshold, the device may determine occurrence of saturation.

If saturation, or deviation from the expected received power, is detected at wireless power receiver 330, for example by one of the methods described above, the wireless power receiver 330 may send a further change request to wireless power transmitter 310 in order to avoid saturation or return to a non-saturated state. Wireless power receiver 330 may for example send a further change request to decrease transmitter power, to suspend power transmission for a time period, or to end power transfer, as described elsewhere in this document. If saturation, or deviation from the expected received power, is detected at wireless power transmitter device 300, for example by one of the methods described above, the wireless power transmitter 310 may decrease transmitter power or end power transfer to avoid saturation, either in wireless power receiver device 320 or wireless power transmitter device 300 itself, or, cause either device to return to a non-saturated state.

According to embodiments of the invention, a wireless power transfer device may perform saturation detection periodically. In one example, a predetermined time is waited after performing saturation detection again. The waiting time may also depend on the result of the saturation detection. For example, if it is determined that saturation has occurred the device may wait for a first time interval until performing another saturation detection and if it is determined that saturation has not occurred the device may wait for a second time interval until performing another saturation detection. In one embodiment, the first time interval is shorter than the second time interval, for example from one second to ten seconds, and the second time interval is longer than the first time interval, for example from ten seconds to one minute. It should be understood that the mentioned time periods are merely examples and that different time intervals may be used without departing from the scope of the invention.

According to embodiments of the invention, wireless power receiver device 320 may estimate and store the transmitted power level based on one or more change requests sent to the wireless power transmitter 310. Wireless power receiver device 320 may for example add or subtract the amount of requested change to/from an earlier transmit power value or store the requested power level(s) as such. Wireless power receiver may measure the received power and thus wireless power receiver 330 may be capable of determining a relationship between the transmitted power and the received power, such as for example shown in FIG. 4c. After storing a plurality of reception levels and estimates of transmitted power, the wireless power receiver 330 may determine whether the plurality of reception levels corresponds to the change requests.

Determining whether at least one of a plurality of reception levels does not correspond to the one or more change requests may comprise, for example, determining whether a change in reception level as a result of a change in transmission power corresponds to a change in reception level that is expected. The change in transmission power in this case occurs as a response to the one or more change requests. For example, if a reception power increases by 1.2 dB in response to a request to increase transmission power by 2 dB, the reception level does not correspond to the change request. A deviation from the expected reception level may be due to saturation. A receiver may be configured to responsively to the unexpected reception level transmit a further change request, the further change request requesting the transmission power to be decreased toward a range where saturation does not occur.

The algorithms described herein may be implemented in various parts of wireless power transmitter device 300 and/or wireless power received device 320, such as for example parts of voltage and current control circuitries 311, 331 and/or control circuitries 301, 321.

Figure 5:
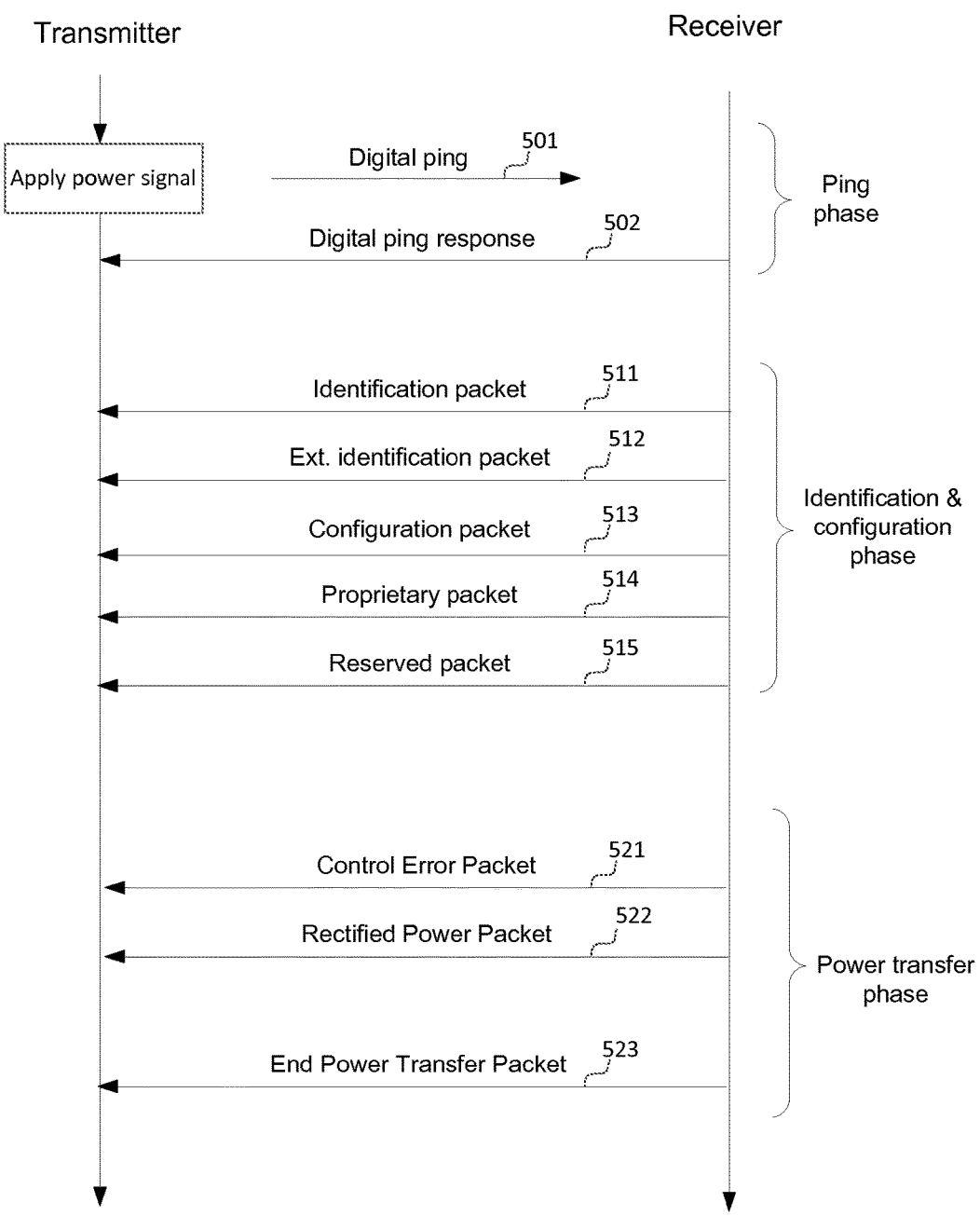
FIG. 5 illustrates communication between a wireless power transmitter and a wireless power receiver, according example embodiments of the invention.

FIG. 5 illustrates an example of communication between a wireless power transmitter, such as for example wireless power transmitter 310 and a wireless power receiver 330, according to embodiments of the invention. Wireless power transfer may comprise a ping phase to identify whether an object is proximate to the wireless power transmitter 310 and to identify whether a potentially detected object is capable or willing to receive wireless power. If a wireless power transmitter 310 detects on object, it may apply a power signal that may be seen as transmitting a digital ping signal 501 to a potential wireless power receiver. A wireless power receiver 330 may send a digital ping response 502 that may comprise information about the wireless power receiver 330 or the wireless power transfer in general. The digital ping response 502 may for example comprise a signal strength indicator that gives information about the degree of coupling between the wireless power transmitter 301 and wireless power receiver 310, or, a request to end power transfer. The digital ping response, as well as other packets, may be sent by the communication circuitry 332 of the wireless power receiver 330, for example.

If a desired digital response 502 is received, transmitter 310 and receiver 330 may enter an identification and configuration phase, where the wireless power transmitter 310 may identify the wireless power receiver 330 and receive configuration information. Wireless power receiver 330 may send an identification packet 511 that may for example comprise a manufacturer code and/or a device identifier. The identification packet may also indicate that an extended version of the identification packet is used or that a subsequent extension packet 512 will be sent later. Such extension part may comprise an extension device identifier that may be used for example to inform transmitter 310 about the type, profile, or capabilities of the receiver 330, for example. Phases 511 and 522 of the illustrated signaling are optional.

Wireless power receiver 330 may send one or more configuration packets 513 to inform the wireless power transmitter 310 about preferred power transfer parameters. Configuration packets may for example comprise a power class of the receiver 330, a maximum power accepted by receiver 330, and/or an indication that transmitted power may be controlled by a proprietary method or a method agreed between transmitter 310 and receiver 330.

Wireless power receiver 330 may send one or more optional proprietary packets 514 that may not be compatible with all wireless power transmitters 310. The proprietary packets may for example comprise information related to the proprietary power control method indicated in the configuration packet 513.

Wireless power receiver 330 may send one or more optional reserved packets 515. These packets may be used for example to indicate and/or provide information about power control methods defined in a later version of a power transfer specification, such as for example the Qi specification by Wireless Power Consortium.

After the identification and configuration phase the wireless power transmitter 310 and wireless power receiver 330 may enter a power transfer phase, where receiver 330 may send various types packets to transmitter 310. Wireless power receiver may transmit one or more control error packets 521, which may comprise information for the wireless power receiver about desired operating point, such as for example a power level or frequency. Control error packet may comprise a control error value that indicates a requested change in the operating point, for example the transmitted power level of the wireless power signal 350.

Wireless power receiver 330 may send a rectified power packet 522, which may inform the wireless power transmitter 310 about a received power at receiver 330. Rectified power may be expressed for example as a percentage of the maximum power indicated in configuration packet 513.

Wireless power receiver 330 may send an end power transfer packet 523 to request wireless power transmitter 310 to cease providing a magnetic flux for the time being. End power transfer packet may optionally comprise an interrupt period during which power transmission should be suspended.

Figure 6:
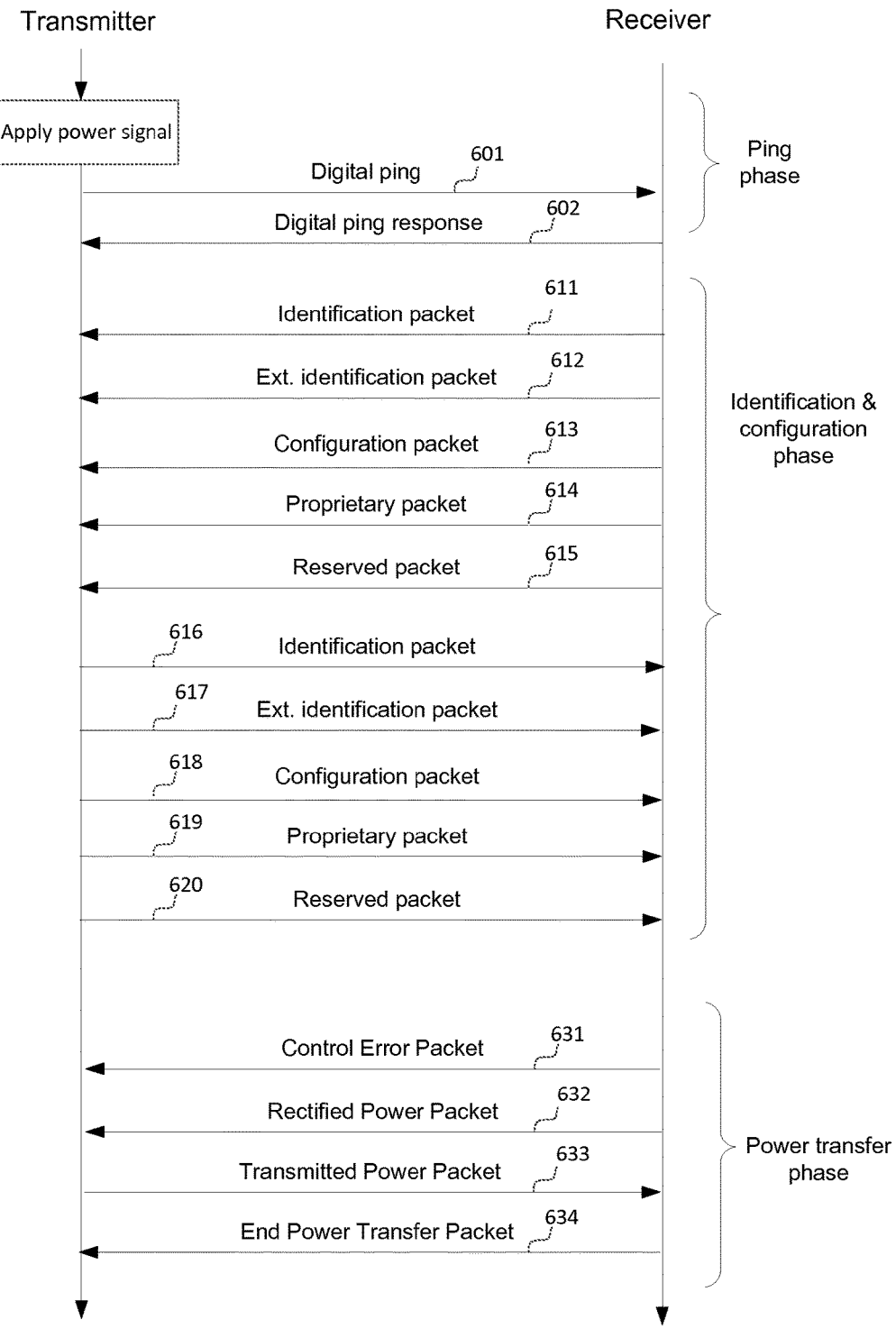
FIG. 6 illustrates communication between a wireless power transmitter and a wireless power receiver, according example embodiments of the invention.

FIG. 6 illustrates an example of communication between a wireless power transmitter, such as for example wireless power transmitter 310 and a wireless power receiver 330, according to embodiments of the invention. In this example, the wireless power transmitter 310 may be capable of sending packets to wireless power receiver 330. Communication from transmitter 310 may be implemented for example in communication circuitry 312, as described elsewhere in this document. During the ping phase, wireless power transmitter 310 may send a digital ping signal 601, which may comprise information about the wireless power transmitter 310 or the wireless power transfer in general. A wireless power receiver 330 may send a digital ping response 602, similar to digital ping response 502.

In the identification and configuration phase, the wireless power receiver may send one or more identification packets 611, one or more extended identification packets 612, one or more configuration packets 613, one or more proprietary packets 614, and/or one or more reserved packets 615. Packets 611, 612, 613, 614 may be similar to packets 511, 512, 513, 514, 515, respectively.

Wireless power transmitter 310 may send an identification packet 616 that may for example comprise a manufacturer code and/or a device identifier. Identification packet 616 may also indicate that an extended version of the identification packet 616 is used or that a subsequent extension packet 617 will be sent later. Such extension part may comprise an extension device identifier that may be used for example to inform wireless power receiver 330 about a type, a profile, a role, or capabilities of transmitter 310.

Wireless power transmitter 310 may send one or more configuration packets 618, for example, to inform the wireless power receiver 330 about power transfer parameters. Configuration packets 618 may for example comprise a power class of transmitter 310, a maximum power provided by transmitter 310, or an indication that transmitted power may be controlled by a proprietary method or a method agreed between transmitter 310 and receiver 330.

Wireless power transmitter 310 may send one or more proprietary packets 619 that may not be compatible with all wireless power receivers 330. The proprietary packets may for example comprise information related to the proprietary power control method indicated in configuration packet 613 or configuration packet 618.

Wireless power transmitter 310 may send one or more reserved packets 620. These packets may be used for example to indicate and/or provide information about power control methods defined in a later version of a wireless power transfer specification, such as for example the Qi specification by Wireless Power Consortium.

In the power transfer phase, the wireless power receiver may transmit one or more control error packets 631, one or more rectified power packets 632, and/or one or more end power transfer packets 634. Packets 631, 632, 634 may be similar to packets 521, 522, 523.

Wireless power transmitter may send one or more transmitted power packets 633, which may inform the wireless power receiver 330 about the transmitted power. Transmitted power may be expressed for example as a percentage of the indicated maximum power accepted by the receiver or the maximum provided transmitted power.

According to embodiments of the invention, the wireless power receiver 330 may request a change in the transmitted power by various types of messages.

A proprietary packet 514, 614 sent by the wireless power receiver 330 may comprise a request to increase or decrease the transmitted power to a new power level. A proprietary packet 514, 614 may include a request to increase or decrease the transmitted power by an amount indicated by an adjustment value. A proprietary packet 514, 614 may include a request to change the transmitted power according to a plurality of transmitted power values. The new power level, the adjustment value, and/or the plurality of transmitted power levels may be included for example in the proprietary packet 514, 614, a prior proprietary packet, a subsequent proprietary packet, any other type of packet, or they may be preconfigured or otherwise signaled to the wireless power transmitter, for example by other communication means such as Bluetooth, WLAN, NFC, or the like. The adjustment value may be indicative of an adjustment that is derived in the wireless power transmitter 310 based on the adjustment value.

A reserved packet 515, 615 sent by the wireless power receiver 330 may comprise a request to increase or decrease the transmitted power to a new power level. A reserved packet 515, 615 may include a request to increase or decrease the transmitted power by an amount indicated by an adjustment value. A reserved packet 515, 615 may include a request to change the transmitted power according to a plurality of transmitted power values. The new power level, the adjustment value, and/or the plurality of transmitted power levels may be included for example in the reserved packet 515, 615, a prior reserved packet, a subsequent reserved packet, any other type of packet, or they may be preconfigured or otherwise signaled to the wireless power transmitter, for example by other communication means such as Bluetooth, WLAN, NFC, or the like. The adjustment value may be indicative of an adjustment that is derived in the wireless power transmitter 310 based on the adjustment value.

Similar information may be sent in identification packet 511, 611, extended identification packet 512, 612, or configuration packet 613. If proprietary packet 514, 614 comprises a request to change power, configuration packet 613 may comprise an indication that transmitted power may be controlled by a proprietary method.

During power transfer, the wireless power receiver may control the transmitter power by sending one or more control error packets 521, 631. Control error packet 521, 631 may for example comprise a request to increase or decrease power to a new level. Control error packet 521, 631 may include a request to increase or decrease the transmitted power by an amount indicated by a control error value included in the control error packet 521, 631. The control error value may indicate a change in the transmitted power and the actual increment or decrement may be derived by the wireless power transmitter 310 based on the control error value. For example, the wireless power transmitter 310 may use a proportional-integral-differential (PID) algorithm of the Qi specification to define a new primary cell current, that is, a new transmitted power level.

According to embodiments of the invention the wireless power transmitter 310 may send information about transmitted power to the wireless power receiver 330.

A digital ping signal 601 sent by the wireless power transmitter 310 may comprise information about the transmitted power level. Transmitted power may be expressed for example as a percentage of the maximum power provided by wireless power transmitter 310. The maximum power provided by wireless power transmitter 310 may be indicated in a subsequent identification packet 616, extended identification packet 617, or configuration packet 618. Including the transmitter power level in the digital ping signal 601 may enable fast initialization of the saturation detection and hence improve protection of the wireless power receiver device.

An identification packet 616 or an extended identification packet 617 may comprise information about the transmitted power level, expressed for example as a percentage of the maximum power provided by wireless power transmitter 310. Including the transmitter power level in the identification packet 616 or extended identification packet 617 may enable fast initialization of the saturation detection and hence improve protection of the wireless power receiver device.

A configuration packet 618 may comprise information about the transmitted power level, expressed for example as a percentage of the maximum power provided by wireless power transmitter 310. Including the transmitter power level in the configuration packet 616 may enable a fast initialization of the saturation detection and hence improve protection of the wireless power receiver device. Including the transmitter power level in the configuration packet 616 also allows using a simple digital ping signal 601, identification packet 616, and an extended identification packet 617.

A proprietary packet 619 may comprise information about the transmitted power level, expressed for example as a percentage of the maximum power provided by wireless power transmitter 310. Including the transmitter power level in one or more proprietary packets 619 may enable saturation detection while maintaining compatibility with a wireless power transfer standard. If transmitted power level is included in the proprietary packet 619, the configuration packet 619, or any other packet, may comprise an indication that a proprietary power control method is used by wireless power transmitter 310 or that wireless power transmitter 310 is capable of operating according to a proprietary power control.

During power transfer, the wireless power transmitter 310 may report the transmitter power level to the wireless power receiver 330 by sending one or more transmitted power packets 633.

The transmitted power may be signaled to the wireless power receiver device by alternative information channels, such as for example Bluetooth, WLAN, NFC, or the like. The transmitted power may be expressed, for example, as a single instance of currently transmitted power, a power adjustment value, a plurality of transmission power values, and/or a schedule for different transmitted power levels.

Figure 7:
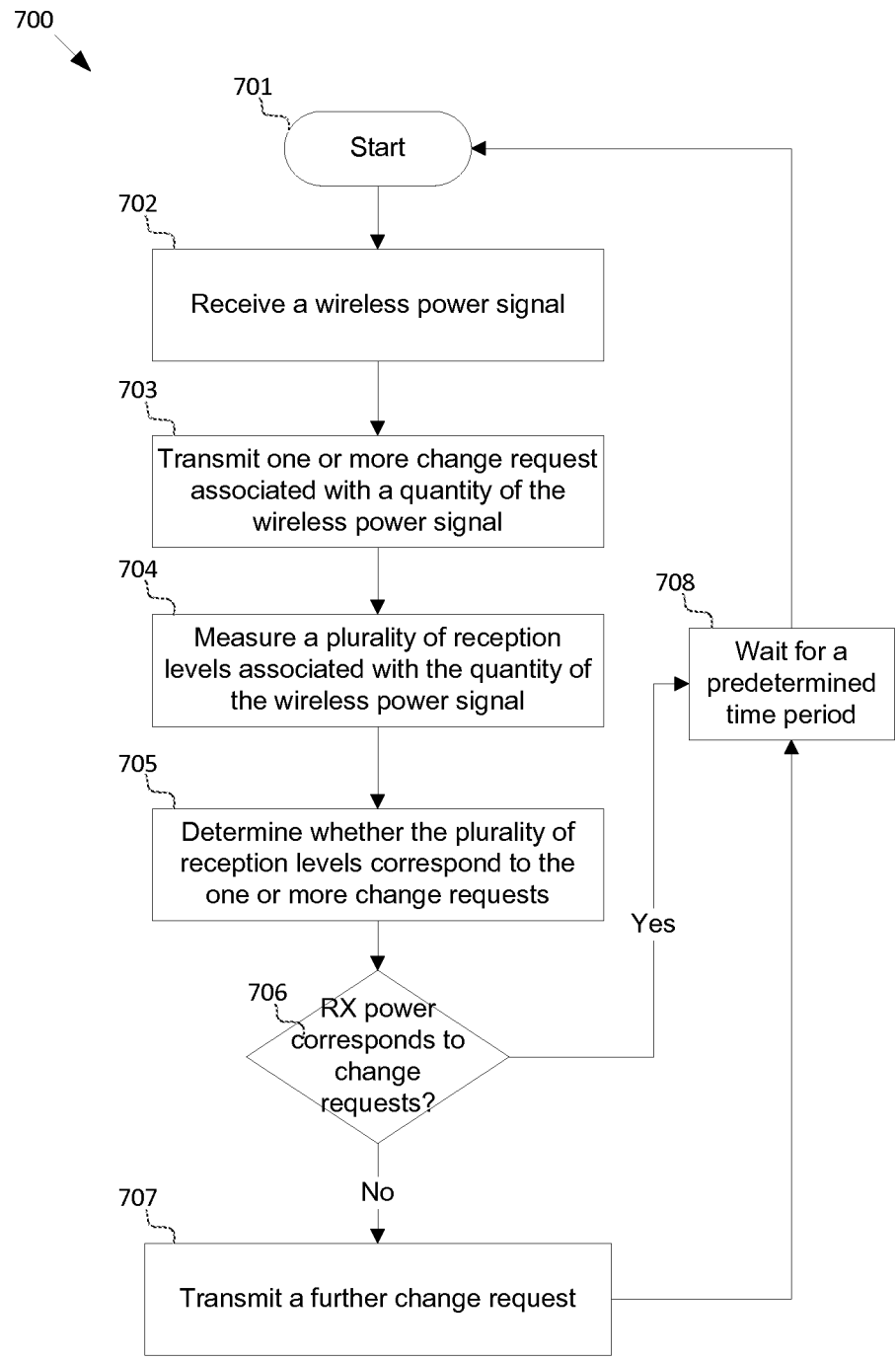
FIG. 7 illustrates an example of a method, according to at least some embodiments of the invention.

FIG. 7 illustrates an example of a method 700 according to at least some embodiments of the invention. Method 700 may be implemented in a wireless power receiver device or it may be implemented in a dual-mode wireless power device having both transmitter and receiver functionality.

Procedure may begin at Phase 701 and proceed to Phase 702 to receive a wireless power signal. In Phase, 703 the device performing the illustrated method may transmit one or more change requests associated with a quantity of the wireless power signal. In Phase 704, the device may measure a plurality of reception levels associated with the quantity of the wireless power signal. Phase 704 may occur at least in part parallel to or preceding step 703. In Phase 705, the device may determine whether the plurality of reception levels correspond to the one or more change requests. If it is determined that the plurality of reception levels does not correspond to the one or more change requests, Phase 706, the procedure may move to Phase 707 to transmit a further change request. If it is determined that the plurality of reception levels corresponds to the one or more change requests, Phase 706, or a further change request has been transmitted in Phase 707, the procedure may move to Phase 708 to wait for a predetermined time until starting the procedure again. A possible reason for the reception levels not corresponding to the one or more change requests is that saturation has affected the performance of a shield.

Figure 8:
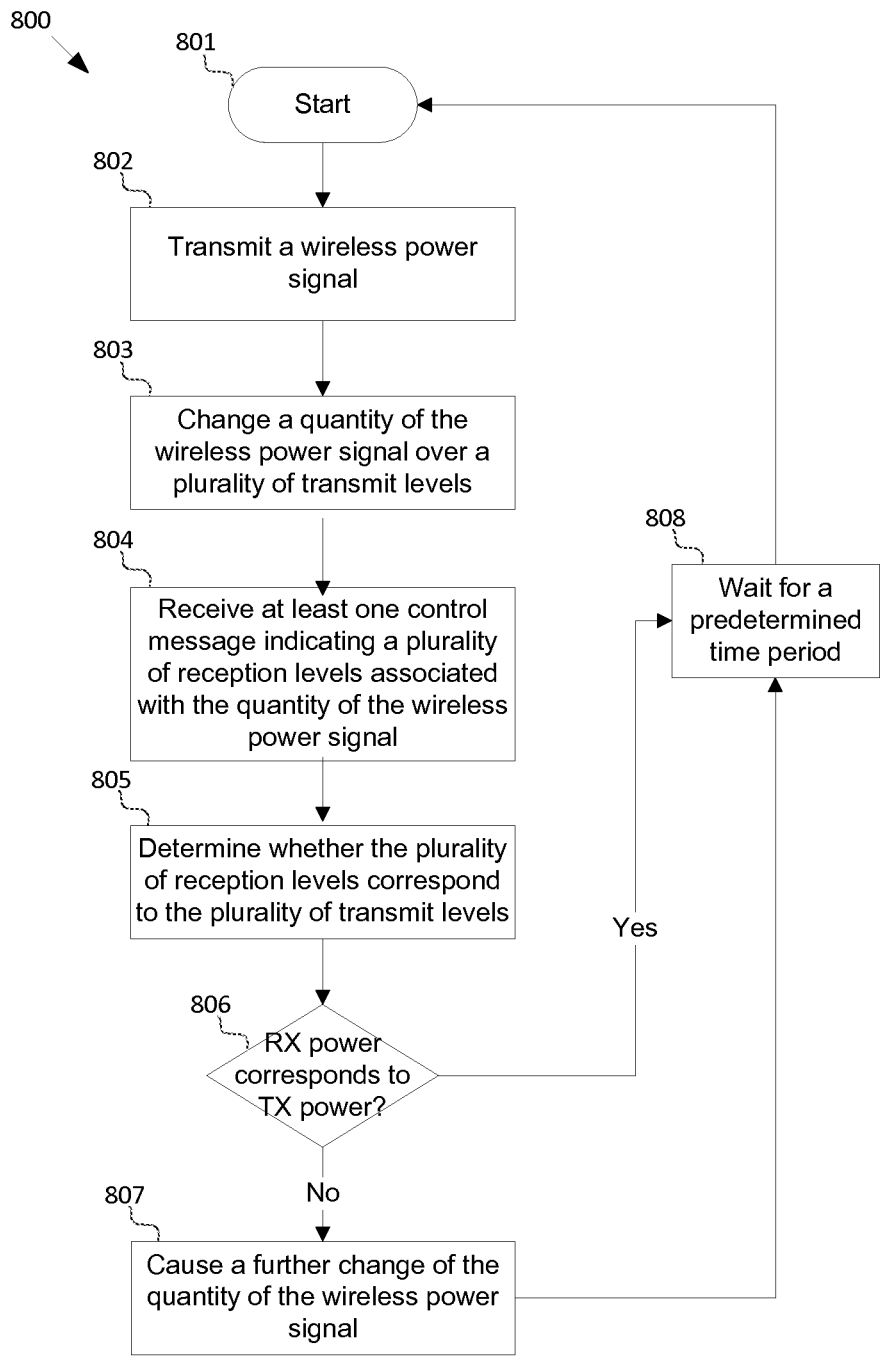
FIG. 8 illustrates an example of a method, according to at least some embodiments of the invention.

FIG. 8 illustrates an example of a method 800 according to embodiments of the invention. Method 800 may be implemented in a wireless power transmitter device or it may be implemented in a dual-mode wireless power device having both transmitter and receiver functionality.

Procedure may begin at Phase 801 and proceed to Phase 802 to transmit a wireless power signal. In Phase, 803 the device performing the illustrated method may change a quantity of the wireless power signal over a plurality of transmit levels. In Phase 804, the device may receive at least one control message indicating a plurality of reception levels associated with the quantity of the wireless power signal. In Phase 805, the device may determine whether the plurality of reception levels corresponds to the plurality of transmit levels. If it is determined that the plurality of reception levels does not correspond to the plurality of transmit levels, Phase 806, the procedure may move to Phase 807 to cause a further change of the quantity of the wireless power signal. If it is determined that the plurality of reception levels corresponds to the plurality of transmit levels, Phase 806, or a further change has been caused in Phase 807, the procedure may move to Phase 808 to wait for a predetermined time until starting the procedure again.

It should be noted that all phases of methods 700 or 800 may not be present in some embodiments of the invention. For example, method 700 may be implemented without Phases 707 and/or 708, for example. Similarly, method 800 may be implemented without Phase s807 and/or 808, for example. The functions may be also performed in a different order. The functionality of the different phases of methods 700 or 800 may be implemented as described elsewhere in this document.

Figure 9:
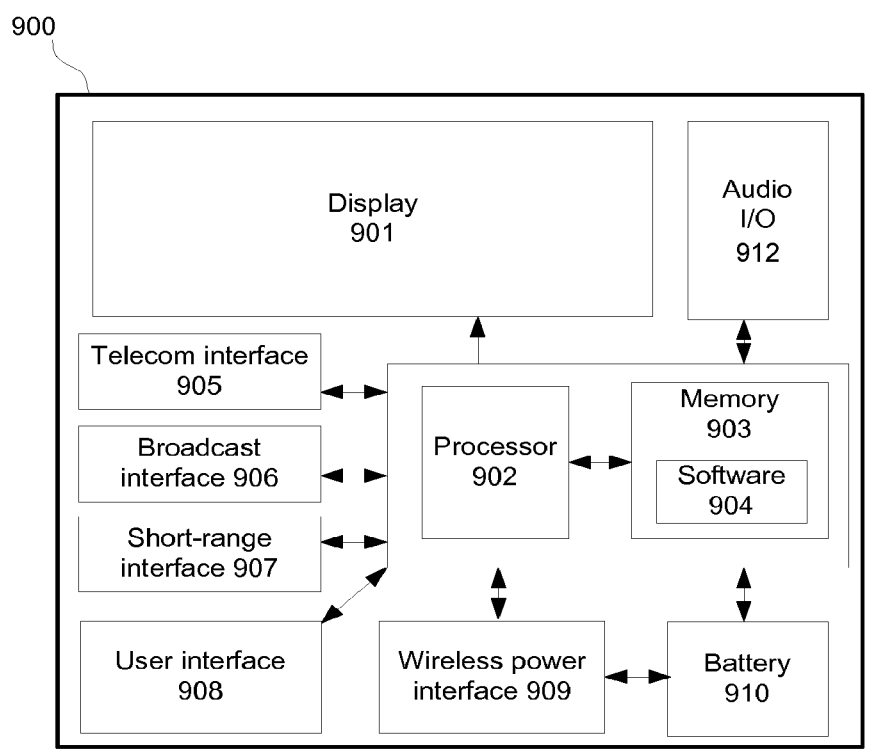
FIG. 9 illustrates an example of an apparatus implementing one or more embodiments of the invention.

FIG. 9 presents an example apparatus where one or more embodiments described herein may be implemented. Apparatus 900 may include at least one processor 902 in connection with at least one memory 903 or other computer readable media. Processor 902 may comprise, for example a single-core or dual-core processor. As a specific non-limiting example, processor 902 may comprise at least one ARM Cortex-A8 processing core manufactured by ARM Holdings plc. Processor 902 or processing cores comprised therein may comprise control circuitry. Memory 903 may be any type of information storing media including random access memory, RAM, read-only memory, ROM, programmable readable memory, PROM, erasable programmable memory, EPROM, and the like, and it may contain software 904 in form of computer executable instructions.

Apparatus 900 may also comprise one or more communication interfaces, for example telecom interface 905, such as for example a Global System for Mobile Communications, GSM, Wideband Code Division Multiple Access, WCDMA, or 3$^{rd}$ Generation Partnership Project--Long term Evolution, 3GPP LTE, cellular radio; a broadcast interface 906, such as for example Digital Video Broadcasting, DVB, Frequency Modulation, FM, Digital Audio Broadcasting, DAB, or Chinese Mobile Multimedia Broadcasting, CMMB, radio; or a short-range interface 907, such as for example a Bluetooth radio, a wireless local area network radio, WLAN, or a near field communication system, NFC. Apparatus 900 may further comprise a user interface 908, display 901, and audio input/output 912 for communicating with the user and a wireless power interface 909 for receiving and/or transmitting energy via electromagnetic induction. At least one of elements 905, 906, 907, 908 and 909 may comprise communication circuitry configured to transmit and/or receive change requests. The apparatus may also comprise a battery 910 capable of being charged and to deliver power for various operations performed in apparatus 900.

Without in any way limiting the scope, interpretation, or application of the claims appearing below, a technical effect of one or more of the example embodiments disclosed herein is to avoid saturation of a magnetic shield in a wireless power transfer device. Another technical effect of one or more of the example embodiments disclosed herein is to improve magnetic protection of internal components of a wireless power transfer device. Yet another technical effect of one or more of the example embodiments disclosed herein is to provide a saturation detection method that can be used in accordance with current wireless power transfer standards. Yet another technical effect of one or more of the example embodiments disclosed herein is to provide a saturation detection method that is backwards compatible with current wireless power transfer standards. Yet another technical effect of one or more of the example embodiments disclosed herein is to provide a saturation detection method that is not deteriorated in presence of foreign objects between the wireless power transmitter and wireless power receiver.

Embodiments of the present invention may be implemented in software, hardware, application logic or a combination of software, hardware and application logic. The software, application logic and/or hardware may reside on an energy transmitting device such as a wireless charging platform or an energy receiving device such as a mobile device to be charged. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 9. A computer-readable medium may comprise a computer-readable storage medium that may be any non-transitory media or means that can contain or store the instructions for use by or in connection with an instruction execution system, apparatus, or device, such as a computer. Although some embodiments of the invention may be described as being implemented by structural elements, the scope of the invention should be understood to cover any means for achieving a particular result in accordance with the structural element in question. For instance, example embodiments of the invention may include means for processing, means for detecting, means for determining, means for sending, means for transmitting, means for receiving, means for enabling, means for disabling, means for providing, means for connecting, means for disconnecting, means for delivering power, means for charging battery, or the like.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus comprising:
   a wireless power receiver configured to receive a wireless power signal;
   communication circuitry configured to transmit one or more change requests associated with a quantity of the wireless power signal; and
   control circuitry configured to:
      measure a plurality of reception levels associated with the quantity of the wireless power signal;
      determine, based on the one or more change requests, a linear model of expected reception levels; and
      in response to determining that at least one of the plurality of reception levels is different from the linear model, transmit a request that is configured to cause a decrease in a transmit power of the wireless power signal, a suspension in transmission of the wireless power signal for a time period, or a stop to transmission of the wireless power signal.

2. The apparatus of claim 1, wherein the quantity of the wireless power signal is a power of the wireless power signal.

3. The apparatus of claim 1, wherein the linear model comprises a linear regression over the plurality of reception levels, and wherein determining that the at least one of the plurality of reception levels is different from the linear model is based on a residual error of the linear regression exceeding a residual threshold.

4. The apparatus of claim 1, wherein the control circuitry is further configured to determine an estimated transmission power of the wireless power signal, and wherein determining that the at least one of the plurality of reception levels is different from the linear model is based on an error between the at least one of the plurality of reception levels and the linear model exceeding an error threshold.

5. The apparatus of claim 4, wherein the apparatus is configured to determine the estimated transmission power based on a current reception power of the wireless power signal and at least one of the one or more change requests.

6. The apparatus of claim 1, wherein the communication circuitry is further configured to receive information indicating the transmit power of the wireless power signal, and wherein causing the apparatus to transmit the request is based on a difference between the at least one of the plurality of reception levels and the transmit power exceeding an error threshold.

7. The apparatus of claim 1, wherein the request is configured to cause the suspension in transmission of the wireless power signal for the time period, or the stop to transmission of the wireless power signal.

8. A method comprising:
   receiving a wireless power signal;
   transmitting one or more change requests associated with a quantity of the wireless power signal;
   measuring a plurality of reception levels associated with the quantity of the wireless power signal; and
   determining, based on the one or more change requests, a linear model of expected reception levels; and
   in response to determining that at least one of the plurality of reception levels is different from the linear model, transmitting a request that is configured to cause a decrease in a transmit power of the wireless power signal, a suspension in transmission of the wireless power signal for a time period, or a stop to transmission of the wireless power signal.

9. The method of claim 8, wherein the quantity of the wireless power signal is a power of the wireless power signal.

10. The method of claim 8, wherein the linear model comprises a linear regression over the plurality of reception levels, and wherein determining that the at least one of the plurality of reception levels is different from the linear model is based on a residual error of the linear regression exceeding a residual threshold.

11. The method of claim 8, further comprising determining an estimated transmission power of the wireless power signal, and wherein determining that the at least one of the plurality of reception levels is different from the linear model is based on an error between the at least one of the plurality of reception levels and the linear model exceeding an error threshold.

12. The method of claim 11, further comprising determining, based on a current reception power of the wireless power signal and at least one of the one or more change requests, the estimated transmission power.

13. The method of claim 8, further comprising receiving information indicating the transmit power of the wireless power signal, and wherein transmitting the request is based on a difference between the at least one of the plurality of reception levels and the transmit power exceeding an error threshold.

14. The method of claim 8, wherein the request is configured to cause the decrease in the transmit power of the wireless power signal.

15. The method of claim 8, wherein the request is configured to cause the decrease in the transmit power of the wireless power signal.

16. The method of claim 8, wherein the request is configured to cause the suspension in transmission of the wireless power signal for the time period.

17. The method of claim 8, wherein the request is configured to cause the stop to transmission of the wireless power signal.

18. One or more computer-readable media storing executable instructions that, when executed, cause an apparatus to at least:
   receive a wireless power signal;
   transmit one or more change requests associated with a quantity of the wireless power signal;
   measure a plurality of reception levels associated with a quantity of the wireless power signal;
   determine, based on the one or more change requests, a linear model of expected reception levels; and
   in response to determining that at least one of the plurality of reception levels is different from the linear model, transmit a request that is configured to cause a decrease in a transmit power of the wireless power signal, a suspension in transmission of the wireless power signal for a time period, or a stop to transmission of the wireless power signal.

19. The one or more computer-readable media of claim 18, wherein the quantity of the wireless power signal is a power of the wireless power signal.

20. The one or more computer-readable media of claim 18, wherein the linear model comprises a linear regression over the plurality of reception levels, and wherein determining that the at least one of the plurality of reception levels is different from the linear model is based on a residual error of the linear regression exceeding a residual threshold.

21. The one or more computer-readable media of claim 18, wherein the executable instructions, when executed, cause the apparatus to at least determine an estimated transmission power of the wireless power signal, and wherein determining that the at least one of the plurality of reception levels is different from the linear model is based on an error between the at least one of the plurality of reception levels and the linear model exceeding an error threshold.

22. The one or more computer-readable media of claim 21, wherein the executable instructions, when executed, cause the apparatus to at least determine, based on a current reception power of the wireless power signal and at least one of the one or more change requests, the estimated transmission power.

23. The one or more computer-readable media of claim 18, wherein the executable instructions, when executed, cause the apparatus to at least receive information indicating the transmit power of the wireless power signal, and wherein causing the apparatus to transmit the request is based on a difference between the at least one of the plurality of reception levels and the transmit power exceeding an error threshold.

24. An apparatus comprising:
one or more processors; and
memory storing executable instructions that, when executed by the one or more processors, cause the apparatus to at least:
receive a wireless power signal;
transmit one or more change requests associated with a quantity of the wireless power signal;
measure a plurality of reception levels associated with a quantity of the wireless power signal;
determine, based on the one or more change requests, a linear model of expected reception levels; and
in response to determining that at least one of the plurality of reception levels is different from the linear model, transmit a request that is configured to cause a decrease in a transmit power of the wireless power signal, a suspension in transmission of the wireless power signal for a time period, or a stop to transmission of the wireless power signal.

25. The apparatus of claim 24, wherein the quantity of the wireless power signal is a power of the wireless power signal.

26. The apparatus of claim 24, wherein the executable instructions, when executed by the one or more processors, cause the apparatus to at least determine an estimated transmission power of the wireless power signal, and wherein determining that the at least one of the plurality of reception levels is different from the linear model is based on an error between the at least one of the plurality of reception levels and the linear model exceeding an error threshold.

\* \* \* \* \*